United States Patent
Hull

(10) Patent No.: US 9,815,204 B2
(45) Date of Patent: Nov. 14, 2017

(54) APPARATUS AND METHOD TO OPTICALLY LOCATE WORKPIECE FOR ROBOTIC OPERATIONS

(71) Applicant: The Boeing Company, Chicago, IL (US)

(72) Inventor: Jerald A. Hull, Charleston, SC (US)

(73) Assignee: The Boeing Company, Chicago, IL (US)

( * ) Notice: Subject to any disclaimer, the term of this patent is extended or adjusted under 35 U.S.C. 154(b) by 72 days.

(21) Appl. No.: 15/004,459

(22) Filed: Jan. 22, 2016

(65) Prior Publication Data

US 2017/0210011 A1    Jul. 27, 2017

(51) Int. Cl.
*B25J 9/00* (2006.01)
*B25J 9/16* (2006.01)

(52) U.S. Cl.
CPC .......... *B25J 9/1697* (2013.01); *B25J 9/1692* (2013.01); *G05B 2219/37571* (2013.01); *G05B 2219/39045* (2013.01); *G05B 2219/40613* (2013.01); *Y10S 901/47* (2013.01)

(58) Field of Classification Search
USPC ................................. 700/245–264
See application file for complete search history.

(56) References Cited

U.S. PATENT DOCUMENTS

| | | | | |
|---|---|---|---|---|
| 4,373,804 A * | 2/1983 | Pryor | .................. | G01B 11/002 356/3.03 |
| 4,456,961 A * | 6/1984 | Price | ...................... | B25J 9/1697 318/568.19 |
| 4,815,845 A * | 3/1989 | Colbaugh | .............. | B64G 1/646 356/153 |
| 5,164,579 A * | 11/1992 | Pryor | .................. | G01B 11/002 250/206.1 |
| 5,195,234 A * | 3/1993 | Pine | ....................... | B25J 9/1697 29/720 |
| 5,280,179 A * | 1/1994 | Pryor | .................. | G01B 11/002 250/559.08 |
| 5,877,491 A * | 3/1999 | Pryor | .................. | G01B 11/002 250/208.1 |
| 5,987,591 A * | 11/1999 | Jyumonji | ............... | B25J 9/1697 700/259 |
| 6,044,308 A * | 3/2000 | Huissoon | ............... | B25J 9/1692 700/166 |

(Continued)

OTHER PUBLICATIONS

Todd Rudberg and Joshua Cemenska; Incorporation of Laser Projectors in Machine Cell Controller Reduces Ply Boundary Inspection Time, On-Part Course Identification and Part Probing; SAE Int. J. Aerosp; vol. 5, Issue 1; Oct. 2012; p. 74-78.

(Continued)

*Primary Examiner* — Jonathan L Sample
(74) *Attorney, Agent, or Firm* — Miller, Matthias & Hull LLP

(57) ABSTRACT

A camera on a robotic arm end effector is used to locate a workpiece coordinate system transformation in rotation and translation with respect to the end effector coordinate system by successively measuring an offset between a target affixed to the workpiece and its expected location. The target reflects energy from a light beam provided by a light beam source. A beam splitter is used to align the light beam with a line of sight of the camera.

18 Claims, 9 Drawing Sheets

(56) References Cited

U.S. PATENT DOCUMENTS

| | | | | |
|---|---|---|---|---|
| 6,070,109 A * | 5/2000 | McGee | B25J 9/1692 700/254 |
| 6,266,142 B1 * | 7/2001 | Junkins | G01S 5/163 250/559.14 |
| 6,314,631 B1 * | 11/2001 | Pryor | A01B 69/008 29/407.04 |
| 7,200,260 B1 * | 4/2007 | Watanabe | B25J 9/1692 382/103 |
| 7,800,758 B1 * | 9/2010 | Bridges | G01B 11/002 356/482 |
| 7,899,577 B2 * | 3/2011 | Ban | B25J 9/1692 318/568.11 |
| 8,485,017 B1 * | 7/2013 | Trompeter | B25J 9/1692 73/1.79 |
| 8,848,203 B2 * | 9/2014 | Bridges | G01C 15/002 356/614 |
| 9,041,914 B2 * | 5/2015 | Tohme | G01S 17/003 356/3.01 |
| 9,061,421 B2 * | 6/2015 | Trompeter | B25J 9/1692 |
| 9,303,988 B2 * | 4/2016 | Tani | G01C 11/02 |
| 9,371,960 B2 * | 6/2016 | Lorimer | H02G 1/02 |
| 9,393,694 B2 * | 7/2016 | Wallack | B25J 9/1692 |
| 2004/0032596 A1 | 2/2004 | Lange | |
| 2004/0093119 A1 * | 5/2004 | Gunnarsson | B25J 9/1638 700/245 |
| 2005/0159842 A1 * | 7/2005 | Ban | B25J 19/023 700/245 |
| 2005/0225278 A1 * | 10/2005 | Ban | B25J 9/1692 318/568.11 |
| 2005/0273199 A1 * | 12/2005 | Ban | B25J 9/1682 700/248 |
| 2006/0106507 A1 * | 5/2006 | Ledet | G05B 19/4207 701/23 |
| 2007/0247615 A1 * | 10/2007 | Bridges | G01B 11/002 356/139.03 |
| 2008/0004750 A1 * | 1/2008 | Ban | B25J 9/1692 700/245 |
| 2008/0111985 A1 * | 5/2008 | Bridges | G01S 5/163 356/3.16 |
| 2008/0150965 A1 * | 6/2008 | Bischoff | G02B 27/01 345/632 |
| 2012/0262550 A1 * | 10/2012 | Bridges | G01C 15/002 348/46 |
| 2014/0173870 A1 | 6/2014 | Otts | |
| 2015/0015700 A1 * | 1/2015 | Becker | G01B 11/14 348/136 |
| 2015/0373321 A1 * | 12/2015 | Bridges | G01S 17/023 348/46 |
| 2017/0003372 A1 * | 1/2017 | Antoina | G01S 17/66 |

OTHER PUBLICATIONS

Search Report for related European Application No. EP16196434.1; report dated May 31, 2017.

* cited by examiner

APPARATUS AND METHOD TO OPTICALLY LOCATE WORKPIECE FOR ROBOTIC OPERATIONS

FIELD

This disclosure relates generally to robotic manufacturing operations and more particularly to identifying the transformation in rotation and translation of a workpiece coordinate system with respect to robot coordinate system during manufacturing operations.

BACKGROUND

Aircraft manufacturing processes have relied on mechanical fixtures to hold workpieces being assembled and mechanics to align tools that are performing manufacturing operations on the workpieces. Increasingly, robots with tools are being used to perform manufacturing functions that previously required such manual aligning operations. However, the accuracy of the robotic work operation relies on knowing the placement of the workpiece relative to the robot and its associated tool or tools.

A tool may be aligned by a robot operator using a tool mounted camera to locate a particular feature, such as a hole or fiducial mark. Customarily, the camera is very slowly positioned close to the workpiece using numerically controlled program commands aided by manual intervention in order to accurately register a small feature against a cluttered background. However, the robotic arm on which the camera is located must be prevented from inadvertently contacting the workpiece or risk damage to any or all of the camera, the robotic arm, or the workpiece. This close proximity placement may involve the use of mechanical feelers or optical sensors, and time consuming visual inspection by the operator. When enough features have been semi-autonomously identified to derive the workpiece coordinate system in three dimensions of rotation and translation, the workpiece can be registered to the coordinate system of the robot and the operator can begin a fully autonomous robotic assembly operation, such as cutting, drilling, fastening, or welding. The semi-autonomous alignment operations described above are labor intensive and can add 10's of minutes or more to the manufacturing operations cycle.

3D locating devices, such as laser range finding equipment or laser projectors are large, expensive, and introduce their own post calibration residual bias errors in addition to the end effector camera usually relied on for machine vision measurements of workpiece features.

SUMMARY

In aspect of the disclosure, a method of locating a workpiece relative to an end effector of a machine includes identifying a point on the workpiece with a reflective element, receiving, at an imager of a camera coupled to the end effector, a light beam including light received from the reflective element, and identifying a centroid of the light received from the reflective element at the imager. The method also includes determining an offset of the centroid from a predicted location of the centroid of the light received from the reflective element and, using the offset, determining an actual location of the workpiece relative to the end effector.

In another aspect of the disclosure, a system for orienting an end effector of a robot arm with a workpiece includes a camera attached to the end effector. The camera has a line of sight formed between a lens of the camera and an imager in the camera. The system also includes a light beam source, attached to the end effector, that projects a light beam as well as a beam splitter that aligns the light beam from the light beam source with the line of sight of the camera. The system further includes a controller that computes a transformation from an end effector coordinate system to a workpiece coordinate system using return light of the light beam reflected from multiple locations on the workpiece based on respective centroids of the return light on the imager from each of the multiple locations.

In yet another aspect of the disclosure, an end effector adapted for use in determining a location of a workpiece includes a frame attached to a robot arm, a work tool used in a manufacturing operation coupled to the frame, and a camera coupled to the frame, the camera having a lens and an imager aligned along a line of sight of the camera. The end effector also includes a light beam subassembly generating a light beam and a beam splitter having at least one reflector that aligns the light beam along the line of sight of the camera and permits at least a portion of a reflection of the light beam to pass to the imager.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

One of the elements of robotic manufacturing operations is that a robot, or more precisely, an end effector of the robot, will operate along a fixed spatial track in a very precise, repeatable manner. Therefore, the location of a workpiece in three dimensions of rotation and translation with respect to a coordinate system of the robot is important for successful autonomous manufacturing operations. In some manufacturing environments, the error tolerance for such placement may be less than hundredths or even thousandths of an inch in each of the three dimensions. As discussed above, the determination of the workpiece coordinate system relative to the coordinate system of the robot may use fiducial marks or other reference points, such as corners, that can be identified using a camera on the end effector. However, it is customary that such a camera operate in a macro level and be placed very close to the fiducial mark or reference point in order to optically discern workpiece features against a cluttered background image using machine vision detection and extraction algorithms. Given the close proximity operation of the robot to the workpiece with large location uncertainty, manual operator intervention is often required to prevent inadvertent robot-to-workpiece collisions. This frequently requires an operator to move the camera to the exact feature location or the use of a mechanical feeler to prevent the camera or end effector from making inadvertent physical contact with the workpiece. Once the bulk pose of the workpiece is known with reasonable accuracy, the robot may perform subsequent operations at high speed with high accuracy.

Figure 1:
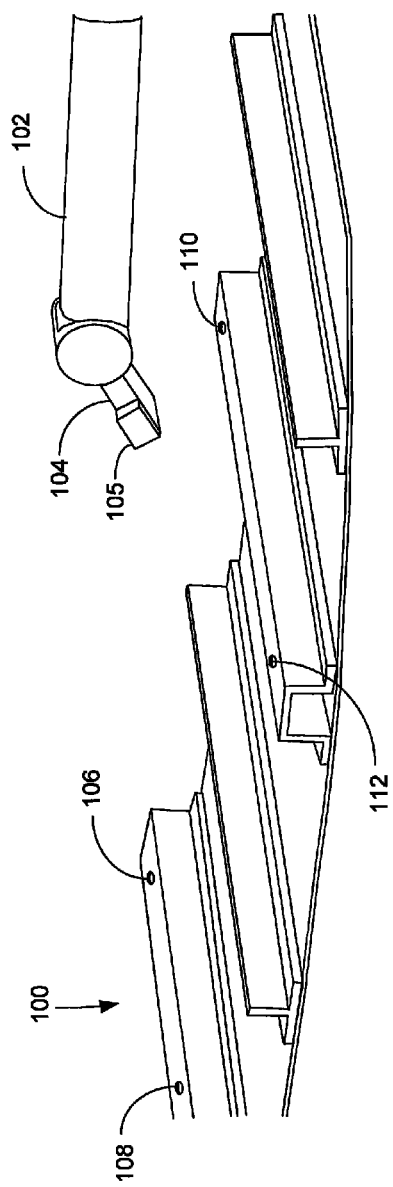
FIG. 1 is a perspective view illustrating a workpiece and a robot in accordance with the current disclosure.

The following discussion discloses a system and method for determining the coordinate system of a workpiece with respect to an end effector coordinate system using light reflected from known points associated with the workpiece. Turning now to the drawings, FIG. 1 is an illustration of a workpiece 100, such as may be employed in a manufacturing operation. The workpiece 100 may be a single element, or may be a subassembly as depicted in FIG. 1. The workpiece 100 may include holes 106, 108, 110, 112 that are disposed at precisely known locations, for example, as part of a previous manufacturing operation. The holes 106, 108, 110, 112 may be created at a previous manufacturing operation step where the workpiece 100 is already in a known position. A robot arm 102 may have an end effector 104, and in the application illustrated in FIG. 1, a tool 105. The end effector 104 may also include a camera assembly, discussed in more detail below with respect to FIG. 4.

Figure 2:
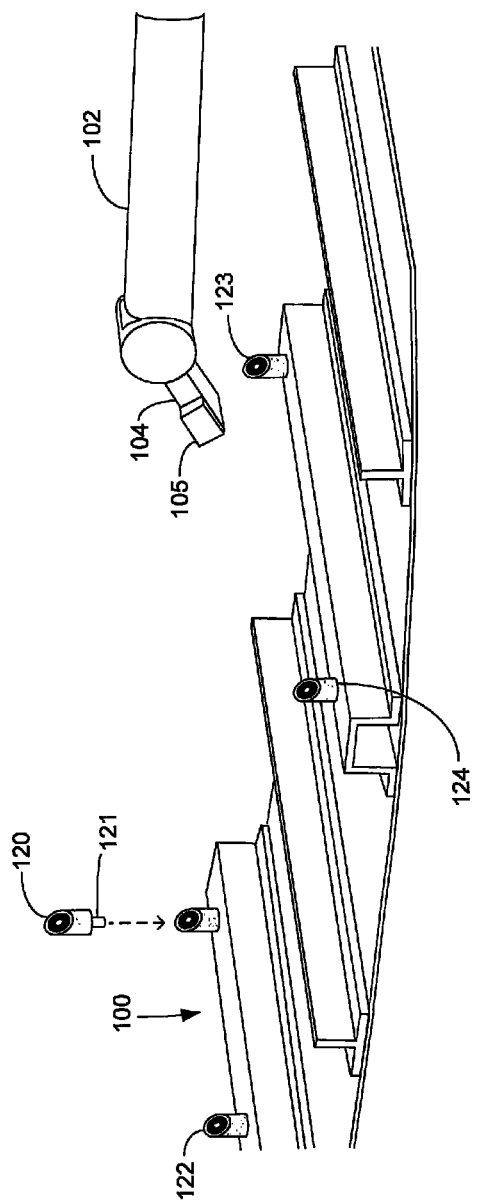
FIG. 2 is a further illustration of the workpiece of FIG. 1.

FIG. 2 illustrates the placement of one or more reflectors 120, 122, 124, 126 on the workpiece 100. Each of the reflectors 120, 122, 124, 126 may have a respective mounting post 121 that allows the reflectors 120, 122, 124, 126 to be accurately, but removably, disposed on the workpiece 100. The reflectors 120, 122, 124, 126 are designed to provide a diffuse highly reflective, high contrast image when illuminated, as discussed more below. Suitable reflectors are commercially available, for example, from Laser Projection Technologies Inc. of Londonderry, N.H.

Figure 3:
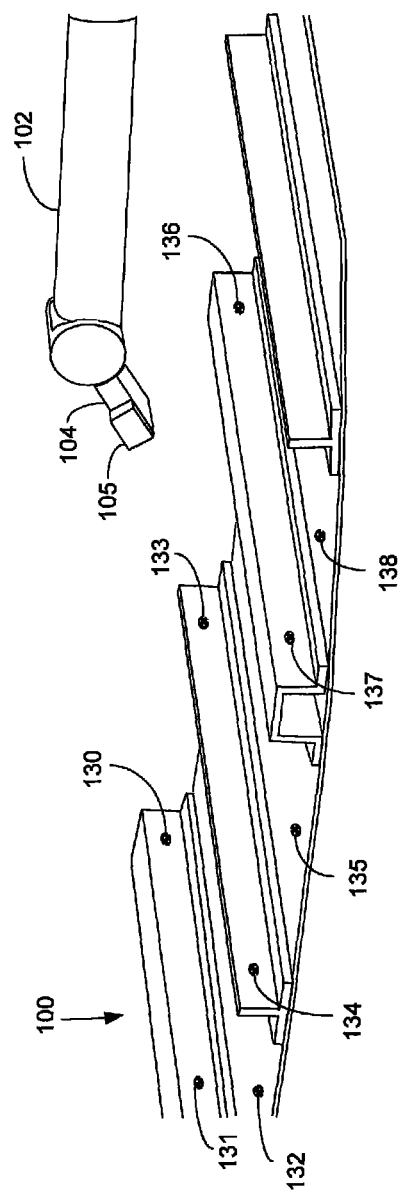
FIG. 3 is a perspective view of another workpiece and the robot.

An alternative to the use of the reflectors 120, 122, 124, 126 is illustrated in FIG. 3, where, instead of the reflectors 120, 122, 124, 126, reflective paint dots 130-138 surrounded by absorptive rings may be disposed at various points on the workpiece 100. The reflective paint dots 130-138 may provide a diffuse reflective surface. The absorptive rings may absorb most incident light adjacent to the paint dots. The absorptive rings around the reflective dots create a high contrast radiant object. The reflective paint dots 130-138 and absorptive rings may also be accurately placed on the workpiece 100, for example, by a robot in a previous manufacturing operation.

Figure 4:
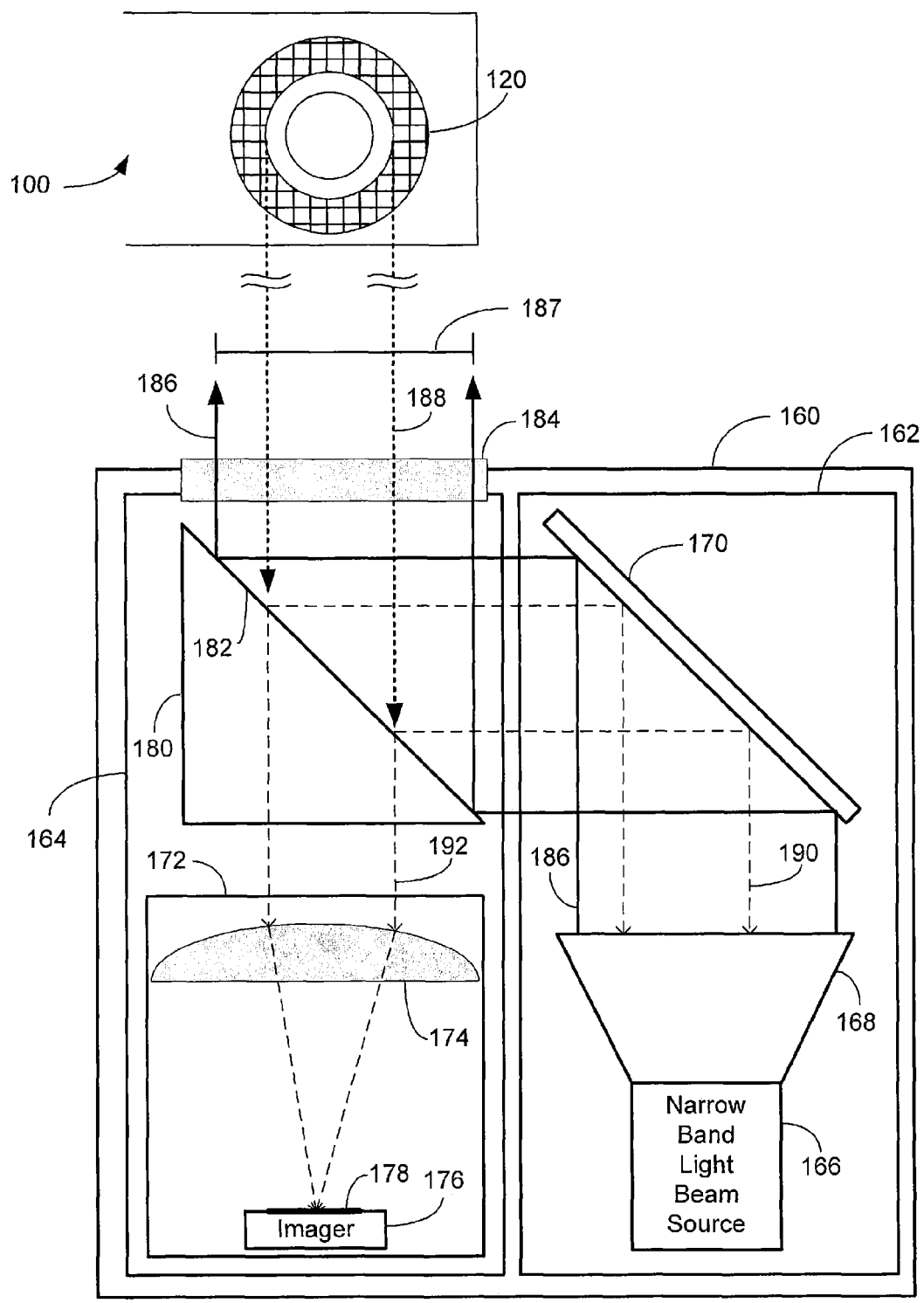
FIG. 4 is an illustration of an imaging assembly of an end effector in a work environment.

FIG. 4 illustrates an embodiment of an imaging assembly 160 for use in optically locating workpieces for robotic operations. The imaging assembly 160 may be affixed to the end effector 104 so that its physical relationship within the end effector 104, and correspondingly, to a tool 105 is accurately known. The imaging assembly 160 may include a light beam subassembly 162 and an imager subassembly 164.

The light beam subassembly 162 may include a light beam source 166, a beam expander 168, and a flat mirror 170. In an embodiment, the light beam source 166 may be a laser that produces a narrowband polarized light beam 186. The beam expander 168 widens the output of the light beam source 166 to a desired diameter 187. For example, if the average variation in the pose of the workpiece 100 is ½ inch, a desired diameter of the beam may be 1 inch so that the light beam is likely to encircle a particular reflector 120 when aimed at its nominal, or expected, location. The light beam source 166 and beam expander 168 are commercially available over-the-counter products. The flat mirror 170 is simply used to alter a path of the light beam 186 for the physical configuration shown in FIG. 4. Other physical configurations are possible based on space requirements. For example, the light beam source 166 and beam expander 168 may be rotated 90° and moved up to the general location of the flat mirror 170 if the required changes to the footprint of the imaging assembly 160 could be accommodated in the end effector 104.

The imager subassembly 164 may have a camera 172 that includes a lens 174 and an imager 176. The imager 176 may have a focal plane 178 that the center of which may be used as a reference point for rotation of the end effector 104 during reflector imaging operations. This will be discussed in more detail below with respect to FIG. 8. The lens 174 may be a variable focus macro lens suitable for use at distances ranging from a few inches to infinity. The lens 174 and imager 176 form a line of sight of the camera 172.

The imager subassembly 164 may also include a beam splitter 180 which, in an embodiment, includes a polarized coated splitting surface 182. The beam splitter 180 allows the light beam 186 to be aligned with the line of sight of the camera, so that outbound and inbound light may be coaxial. A window 184 may be used to transmit light in and out of the imaging assembly 160.

In operation, the imaging assembly 160 may be aimed at an expected location of the reflector 120 so that the light beam 186 outbound from the imaging assembly 160 encircles the reflector 120. A reflected light beam 188 may be transmitted back into the imager subassembly 164. In the case where the workpiece 100 is out of place more than expected, the end effector 104 may be moved to cause the light beam 186 to move in a spiral outward pattern from the expected location until the reflective surface is encircled in the light beam 186 and the reflected light beam 188 is captured at the camera 172, indicating that a reflector has been located. If no reflector is found or if the found reflector is beyond a threshold limit from where it was expected, an error may be raised and an operator may be notified.

While the reflected light beam 188 may be easily identifiable in some cases, other factors may combine to make the reflected light beam 188 more difficult to clearly identify. These conditions may include the distance to the reflector 120, very bright wideband overhead lights, haze from welding operations, high humidity, image of the workpiece surrounding the reflector, etc. Steps may be taken to improve the signal-to-noise ratio of the reflected light beam 188.

One signal-to-noise improvement technique uses the polarized coated splitting surface 182. The outbound light beam 186 may be S polarized and fully reflected from the surface 182. However, reflected light beam 188 may include both S and P polarized light so that the S polarized light 190 is reflected and the P polarized light is passed through the splitting surface 182 to the camera 172. The transmission or reflection of other light incident at surface 182 will depend on the broadband optical properties of the surface 182 coating. Another advantageous embodiment could employ circular polarization in place of the linear polarized light source 166 and splitting surface 182.

Another signal-to-noise improvement may take advantage of the nature of the imager 176. Most pixelated imagers 176 contain a color filter mosaic, with each mosaic element over a pixel being transmissive to a narrow band color of light, such as three primary colors. When calculating a centroid of the reflector image, selecting only the imager 176 primary color the light beam source 166 falls within, will allow all of the ambient (white) light entering the camera 172 within the other 2 primary color bands to be ignored. That is, the light beam source 166 may be selected to present a beam color within one of the color filter mosaic elements. This effectively creates a sharper contrast between the reflector image and everything else in the image resulting in a more accurate calculation of the reflector image centroid.

Figure 5:
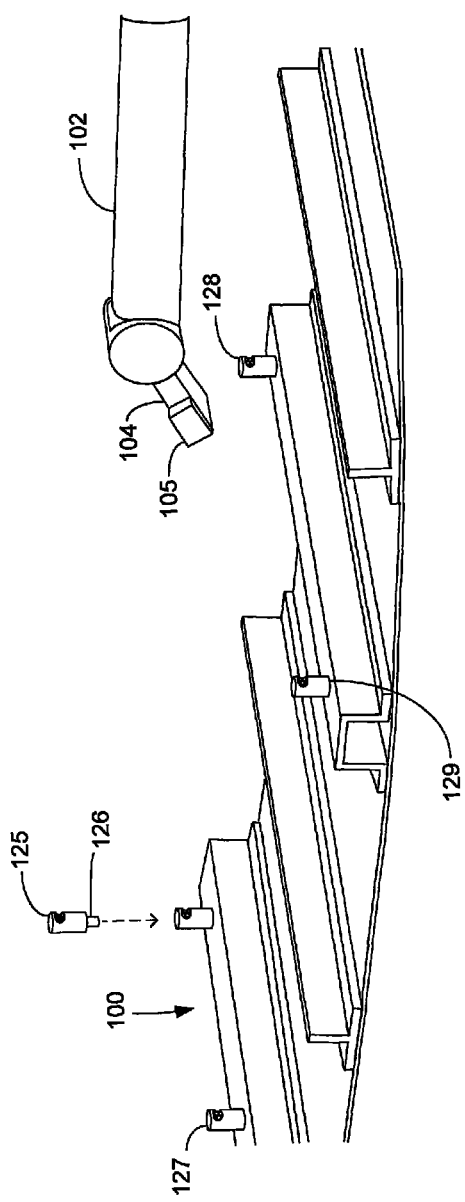
FIG. 5 is an illustration of an alternate embodiment of the workpiece and robot.

FIG. 5 illustrates an alternate embodiment of optically locating workpieces for robotic operations. In the embodiment of FIG. 5, the reflector 120 of FIG. 2 is replaced by an active light source 125, using, for example, a light emitting diode (LED). The active light source 125 may output light beams of random polarization, or preferentially include filtering to output linear or circularly polarized light beams. As discussed above, a color of the LED of the active light source may be selected to present a color within one of the color filter mosaic elements of the camera 172.

Figure 6:
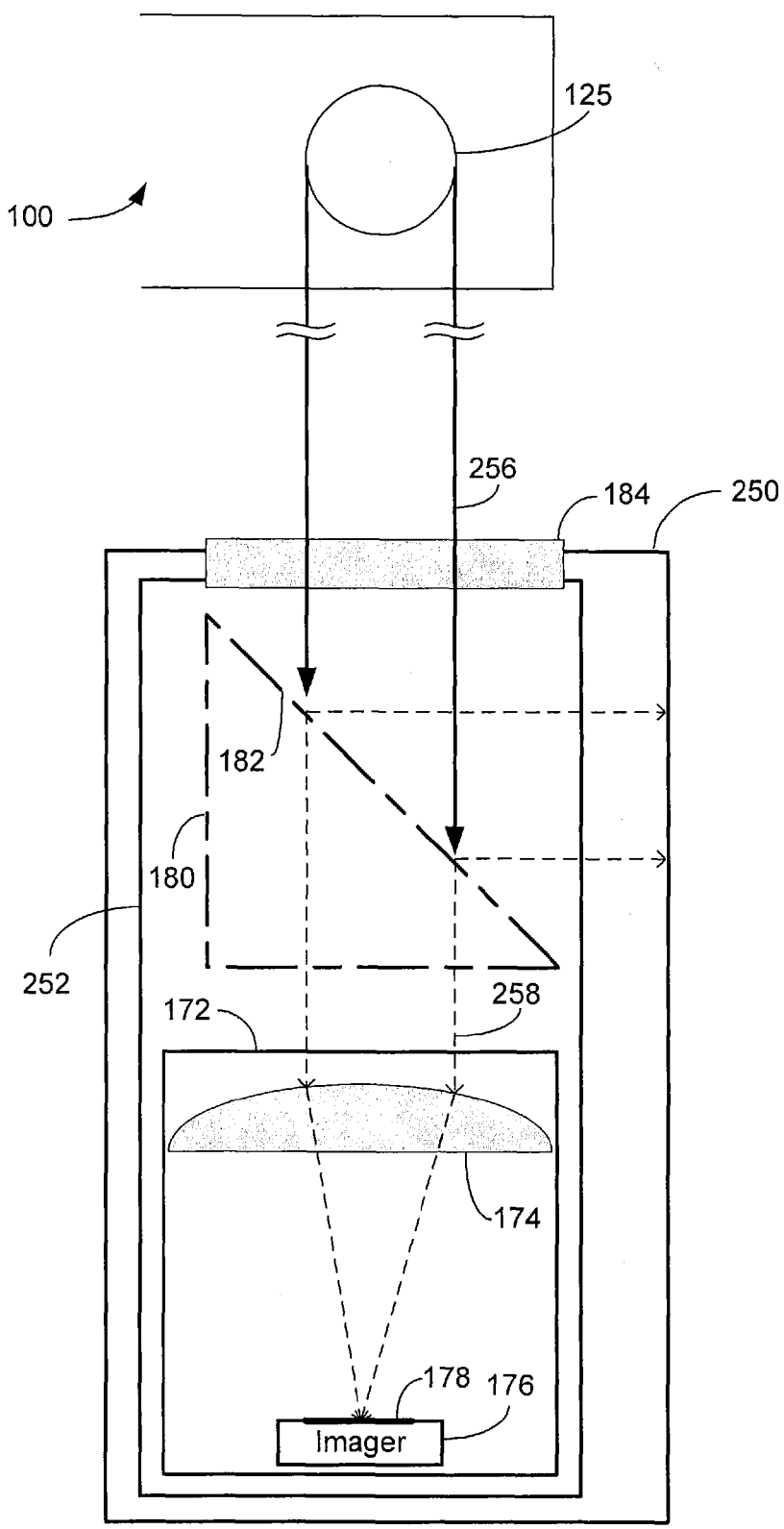
FIG. 6 is an alternate embodiment of an end effector in a work environment.

FIG. 6 illustrates an exemplary imaging assembly 250 suitable for use with the embodiment of FIG. 5. The imaging assembly 250 may include a camera 172, the same as or similar to that used in the imaging assembly 160 of FIG. 4. The camera 172 receives light beams 256 generated at the active light source 125. The imaging assembly 250 may include the beam splitter 180 to provide ambient light noise reduction as discussed above. When used, the polarized coated splitting surface may pass only light beams 258 having a single polarization including linear or circular. However, because the active light source 125 may be randomly polarized, the additional noise reduction provided by the beam splitter 180 may not be achievable or necessary.

Figure 7:
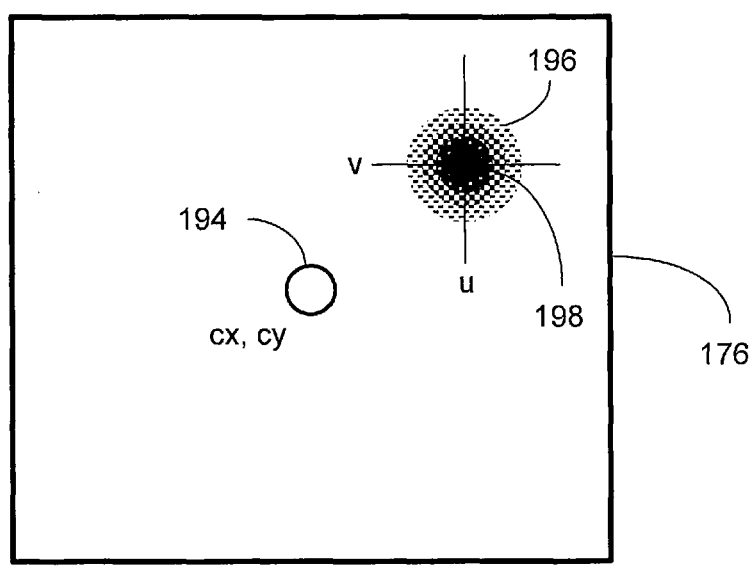
FIG. 7 is an illustration of a centroid of reflected light at an imager of a camera of the imaging assembly of FIG. 4.

Turning to FIG. 7, an imager 176 from the camera 172 is illustrated showing an expected location 194 of the reflected light beam 188 assuming that the workpiece 100 is perfectly posed in its expected position. That is, the imaging assembly 160 is aimed to the expected location of the reflector 120 so that if the workpiece is correctly located, a centroid of the reflected light beam 188 will fall in the exact center of the imager 176. This point is designated location cx, cy in this illustration. Also shown in FIG. 7 is the actual image 196 of the reflected light beam 188. A two dimension centroid 198 of the reflected light beam 188 is designated u, v.

Using these two dimension measurements, their corresponding nominal three dimension locations, as well as known information about the camera such as focal length and lens characteristics, an equation and method can be used to reconstruct the rotation matrix R and translation vector t which transform a nominally posed workpiece to the actual posed workpiece—the desired objective. One such equation and method is the solvepnp( ) function found in the public domain. One expression of the solvepnp( ) is:

$$m' = A[R \mid t]M' \qquad \text{Eq. 1}$$

or $$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \qquad \text{Eq. 2}$$

Where:

[X Y Z 1]' is the column matrix M' of the known 3D coordinates of the reflectors 120, 122, 124, 126, etc. nominal locations

[u v]' is the column matrix m' of the coordinates of the corresponding measured centroid of the reflected light beam 188, in pixels from the reflectors 120, 122, 124, 126, etc.

A is a matrix of camera-specific parameters $(c_x, c_y)$ is the expected location of the reflected light beam 188

$f_x$ and $f_y$ are the focal lengths in pixels

[R|t] is the unknown combined rotation—translation matrix describing the transformation from nominal 3D coordinates to the as measured 2D coordinates Given the measured 2D centroids [u v]', nominal 3D locations [X Y Z 1]', and camera matrix A, the unknown rotation matrix R and translation vector t can be solved by one of various methods such as those published in solvepnp( ).

Figure 8:
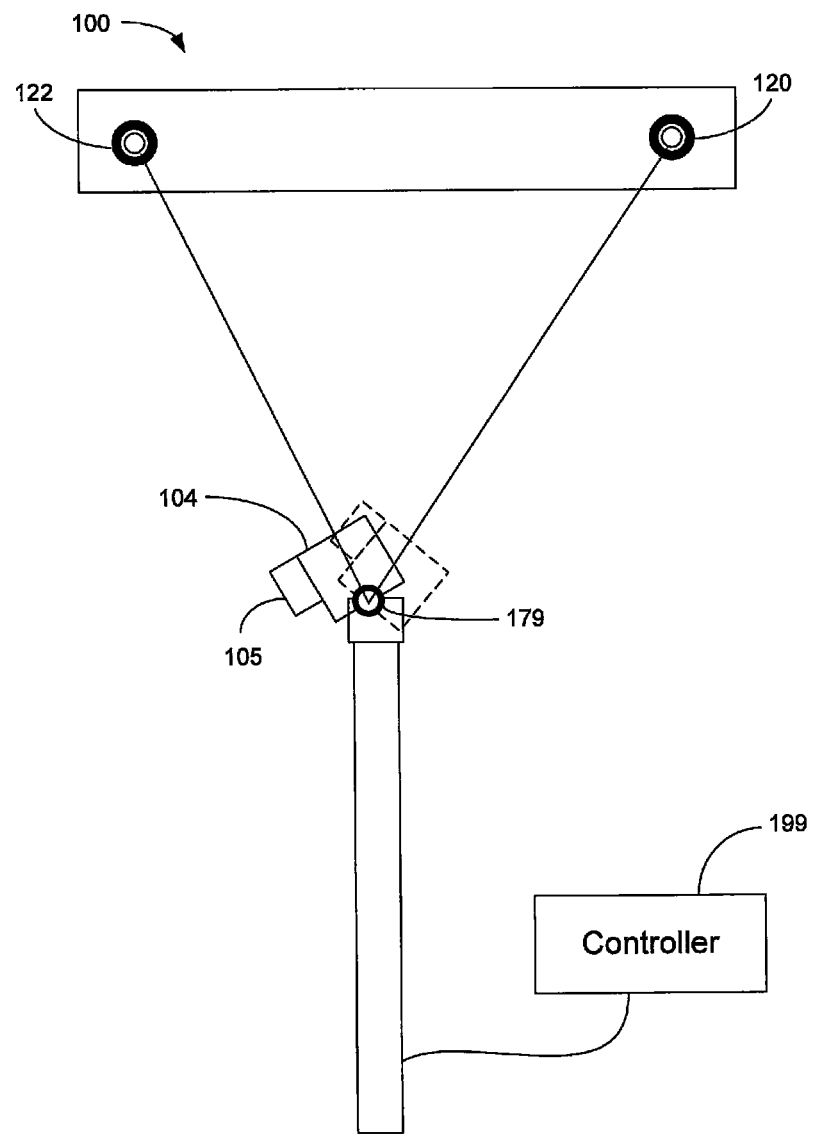
FIG. 8 is a top view of the robot arm and end effector relative to two reflectors.

Equation 2 assumes all the known inputs are from a single camera and pose. Since the camera field of view is not likely large enough to contain all desired reflector locations from a single camera pose, the robot will need to reorient the camera pose between reflector measurements. As depicted in FIG. 8, in the event the focal plane centroid 179 must be rotated and/or translated between reflector measurements, the actual transformation in rotation and translation from one measurement pose to another is accurately known in the end effector coordinate system. A controller 199 can bring these measurements into alignment by transforming each reflector measurement to a common end effector coordinate system. In addition to calculating coordinate system transformations, the controller 199 may control the robot arm 102 and/or the work tool 105.

Figure 9:
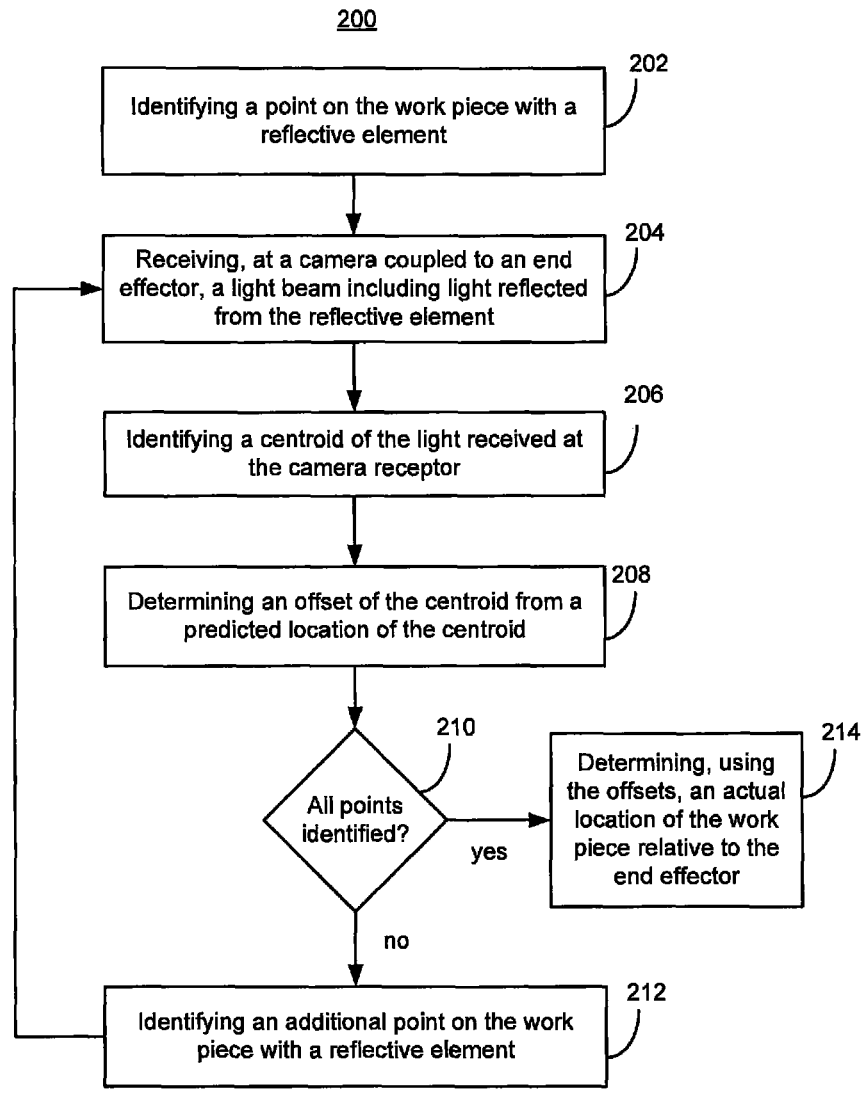
FIG. 9 is an illustration of operations performed by one embodiment of optically locating a workpiece for robotic operations in accordance with the current disclosure.

A method 200 of locating a workpiece relative to an end effector of a machine is illustrated in the flowchart of FIG. 9. At block 202 a point on the workpiece 100 may be identified with a reflector 120. In an embodiment, the point on the workpiece 100 may be identified with a reflective paint dot 130 and absorptive ring or other high contrast luminous or reflective element.

A light beam 192 including light reflected from the reflector 120 may be received at an imager 176 of a camera 172 at block 204. Continuing at block 206, a centroid 198 of the light received at the imager 176 may be determined by, for example, only including pixel measurements above a specified threshold in a center of mass calculation, or in another example, by a cross product image intensity at various locations across the imager 176. Once the centroid 198 has been located, an offset from the centroid 198 to an expected location 194 of the centroid may be determined at block 208.

A test may be made at block 210 to determine if each of the points identified with reflectors 120, 122, 124, 126 have been measured in their respective centroids determined. If not, the 'no' branch may be taken from block 210 to block 212 in the camera 172 may be aimed at another reflective element. Processing may continue at block 204 until all points have been identified in the 'yes' branch from block 210 may be taken to block 214. At block 214 using the offset is an actual location of the workpiece 100 relative to the end effector 104 may be calculated. Using the actual location, the workpiece 100 may be oriented with respect to the coordinate space of the robot arm 102 so that a manufacturing operation using a tool 105 may be performed on the workpiece 100.

In some embodiments, the camera 172 is already in place in an end effector 104 for use in macro operations such as close up fiducial mark identification, location validation for use of the tool 105, quality verification of a completed manufacturing operation, or some combination of these, among other possible uses.

The ability to locate the workpiece 100 relative to the coordinate system of a robot arm 102 at a distance has several benefits. To the manufacturer, one advantage is to cut as much as 10's of minutes out of locating a workpiece pose. Since it is not uncommon to reposition a large workpiece several times within a limited robot work envelope, the multitude of reposition events represents a significant reduction in time and therefore cost for robot-performed manufacturing operations. Further, by allowing the robot to perform workpiece location at a distance, operator stress is reduced by removing the need to drive the end effector 104 to extreme close range, for example, using feeler gauges. Eliminating close up operations also helps to avoid costly downtime when the prior art method results in damage to the end effector 104, the robot arm 102, or the workpiece 100 due to unintentional contact between components.

While only certain embodiments have been set forth, alternatives and modifications will be apparent from the above description to those skilled in the art. These and other alternatives are considered equivalents and within the spirit and scope of this disclosure and the appended claims.

What is claimed:

1. A method of determining a coordinate system transformation from an end effector coordinate system of an end effector of a machine to a coordinate system of a workpiece, the method comprising:
    identifying each point on the workpiece via a respective reflective element;
    illuminating each of the respective reflective elements with a light beam source, the light beam source coupled to the end effector;
    receiving, at an imager of a camera coupled to the end effector and proximate the light beam source, light beams including reflected light received from the identified points;
    identifying a respective centroid of the light received from each of the identified points at the imager;
    determining an offset of each respective centroid from a predicted location of the respective centroid of the light received from the each of the identified points; and
    using the offsets, determining the coordinate system transformation in rotation and translation of the coordinate system of the workpiece relative to the end effector coordinate system.

2. The method of claim 1, wherein receiving, at the imager of the camera, the light beams including the light received from the identified points further includes receiving the light beams at a focal plane of the imager, wherein the method further comprises:
    rotating the end effector about a centroid of the focal plane of the imager to receive the light beams from each of the identified points on the workpiece.

3. The method of claim 1, further comprising illuminating each of the respective reflective elements with a polarized light.

4. The method of claim 1, wherein identifying the points on the workpiece comprises attaching an active light source to each respective point on the workpiece.

5. The method of claim 1, wherein determining the coordinate system transformation from the end effector coordinate system to the coordinate system of the workpiece comprises using a two-dimension to three-dimension reconstruction algorithm.

6. A system for orienting an end effector of a robot arm with respect to a workpiece, the system comprising:
    a camera attached to the end effector, the camera having a line of sight formed between a lens of the camera and an imager in the camera;
    a light beam source attached to the end effector, the light beam source projecting a light beam to each of multiple locations on the workpiece, each of the multiple locations including a reflective element; and
    a controller that computes a transformation from an end effector coordinate system to a workpiece coordinate system using the light beam received from each of the multiple locations on the workpiece based on respective centroids of the light beam on the imager from each of the multiple location.

7. The system of claim 6, further comprising:
    a beam splitter that aligns the light beam from the light beam source with the line of sight of the camera.

8. The system of claim 7, further comprising a diffuse reflector at each of the multiple locations on the workpiece.

9. The system of claim 8, wherein the diffuse reflector is one of a paint marking and a retro-reflective target.

10. The system of claim 7, wherein the light beam source comprises a beam expander that increases a diameter of the light beam to approximately a size of a target at the multiple locations plus an initial location tolerance.

11. The system of claim 7, wherein the beam splitter comprises a filtered beam splitter that selectively passes a portion of the light beam received from each of the multiple locations.

12. The system of claim 6, wherein each of the multiple locations on the workpiece further comprises an active light source that generates an active light beam.

13. The system of claim 12, wherein the active light source is a polarized light source.

14. An end effector of a robot arm adapted for use in determining a location of a workpiece, the end effector including:
    a work tool used in a manufacturing operation;
    a camera mounted in a known relationship to the work tool, the camera having a lens and an imager aligned along a line of sight of the camera;
    a light beam subassembly generating a light beam; and
    a beam splitter having at least one reflector that aligns the light beam along the line of sight of the camera and permits at least a portion of a reflection of the light beam to pass to the imager for identifying a respective centroid of the portion of the reflection of the light beam.

15. The end effector of claim 14, wherein the light beam subassembly comprises a beam expander.

16. The end effector of claim 14, wherein the at least one reflector of the beam splitter is a filtered beam splitter.

17. The end effector of claim 14, wherein the light beam subassembly is tuned to provide a beam color matching a color of a color filter mosaic element of the imager.

18. The end effector of claim 14, wherein the lens is a variable focus lens adapted for adjustment between macro focus and distance focus.

\* \* \* \* \*